United States Patent [19]

Sakakibara

[11] Patent Number: 4,733,761
[45] Date of Patent: Mar. 29, 1988

[54] POWER DELIVERY SYSTEM
[75] Inventor: Shiro Sakakibara, Anjo, Japan
[73] Assignee: Aisin-Warner Limited, Japan
[21] Appl. No.: 675,875
[22] Filed: Nov. 28, 1984
[51] Int. Cl.$^4$ .................. F16H 45/02; F16D 13/44
[52] U.S. Cl. .................... 192/3.25; 192/3.21; 192/3.31; 192/70.27
[58] Field of Search .................. 192/3.25, 3.26, 3.27, 192/3.29, 3.3, 3.31, 3.21, 70.27, 89 B; 384/611, 620

[56] References Cited

U.S. PATENT DOCUMENTS

| Re. 22,967 | 1/1948 | Nutt et al. | 192/3.3 X |
|---|---|---|---|
| 1,689,244 | 10/1928 | Klimek | 192/3.21 |
| 2,212,278 | 8/1940 | Sinclair | 192/3.25 X |
| 2,229,319 | 1/1941 | Wesselhoff | 192/3.21 X |
| 2,355,709 | 8/1944 | Dodge | 192/3.25 |
| 2,399,886 | 5/1946 | Odevseff | 192/89 B X |
| 2,548,207 | 4/1951 | Dunn | 192/3.29 X |
| 2,625,247 | 1/1953 | Shurts | 192/3.21 X |
| 2,707,539 | 5/1955 | Marble | 192/3.26 X |
| 2,747,430 | 5/1956 | Forster et al. | 192/3.3 X |
| 2,891,640 | 6/1959 | Binder | 192/3.26 X |
| 3,189,144 | 6/1965 | Gabriel | 192/3.29 |
| 3,440,903 | 4/1969 | Kaptur | 192/3.21 X |
| 3,542,174 | 11/1970 | Hattori | 192/3.31 X |
| 3,747,436 | 7/1973 | Hause | 192/3.26 |
| 4,166,659 | 9/1979 | Gleichman | 384/620 |
| 4,510,747 | 4/1985 | Yoshida | 192/3.29 X |
| 4,657,122 | 4/1987 | Sakakibara et al. | 192/3.31 |

FOREIGN PATENT DOCUMENTS

| 643379 | 4/1937 | Fed. Rep. of Germany | 192/3.25 |
|---|---|---|---|
| 2535002 | 4/1984 | France | 192/3.25 |
| 449819 | 7/1936 | United Kingdom | 192/3.21 |
| 710986 | 6/1954 | United Kingdom | 192/3.21 |
| 2019958 | 11/1979 | United Kingdom | 192/3.31 |

Primary Examiner—Rodney H. Bonck
Assistant Examiner—Richard M. Lorence
Attorney, Agent, or Firm—Lorusso & Loud

[57] ABSTRACT

A power delivery system including an input shaft for transmitting driving power of an engine, an output shaft mounted concentrically with the input shaft, a pump mounted concentrically between the input and output shafts and connected to the input shaft, a fluid coupling having a turbine connected to the output shaft, a case containing the fluid coupling, and a power cut-off device, characterized in that the power cut-off device is provided with a frictional coupling element and a servo mechanism thereof and mounted in the aforementioned case.

12 Claims, 14 Drawing Figures

POWER DELIVERY SYSTEM

BACKGROUND OF THE INVENTION (i) Field of the Invention

This invention relates to a power delivery system employing a combination of a fluid coupling and a power cut-off clutch.

(ii) Description of the Prior Art

It has been the conventional practice with power delivery systems of this type to mount a fluid coupling and a cut-off clutch axially in series in one and the same case or to mount them in separate cases which are connected axially in series. These arrangements usually result in power delivery systems of large size and complicated construction unsuitable for mounting on small-size motor vehicles.

SUMMARY OF THE INVENTION

It is an object of the present invention to provide a power delivery system which is axially compact, accommodating in a single case a fluid coupling, a power cut-off clutch and/or a lock-up clutch, and spring means of the clutch servo mechanism in parallel with the axis of the system.

It is another object of the present invention to provide a power delivery system of simplified construction utilizing one and same case commonly for the fluid coupling and clutch.

According to the present invention, there is provided a power delivery system, which includes: an input shaft for transmitting driving power from an engine; an output shaft mounted concentrically with the input shaft; a pump mounted concentrically between the input and output shafts and connected to the input shaft; a fluid coupling including a turbine connected to the output shaft; a case containing the fluid coupling; and a power cut-off device; characterized in that the power cut-off device is provided with a frictional coupling element and a servo mechanism, contained in the afore-mentioned case.

The above and other objects, features and advantages of the invention will become apparent from the following description and appended claims, taken in conjunction with the accompanying drawings which show by way of example some preferred embodiments of the invention.

DESCRIPTION OF PREFERRED EMBODIMENTS

Figure 1:
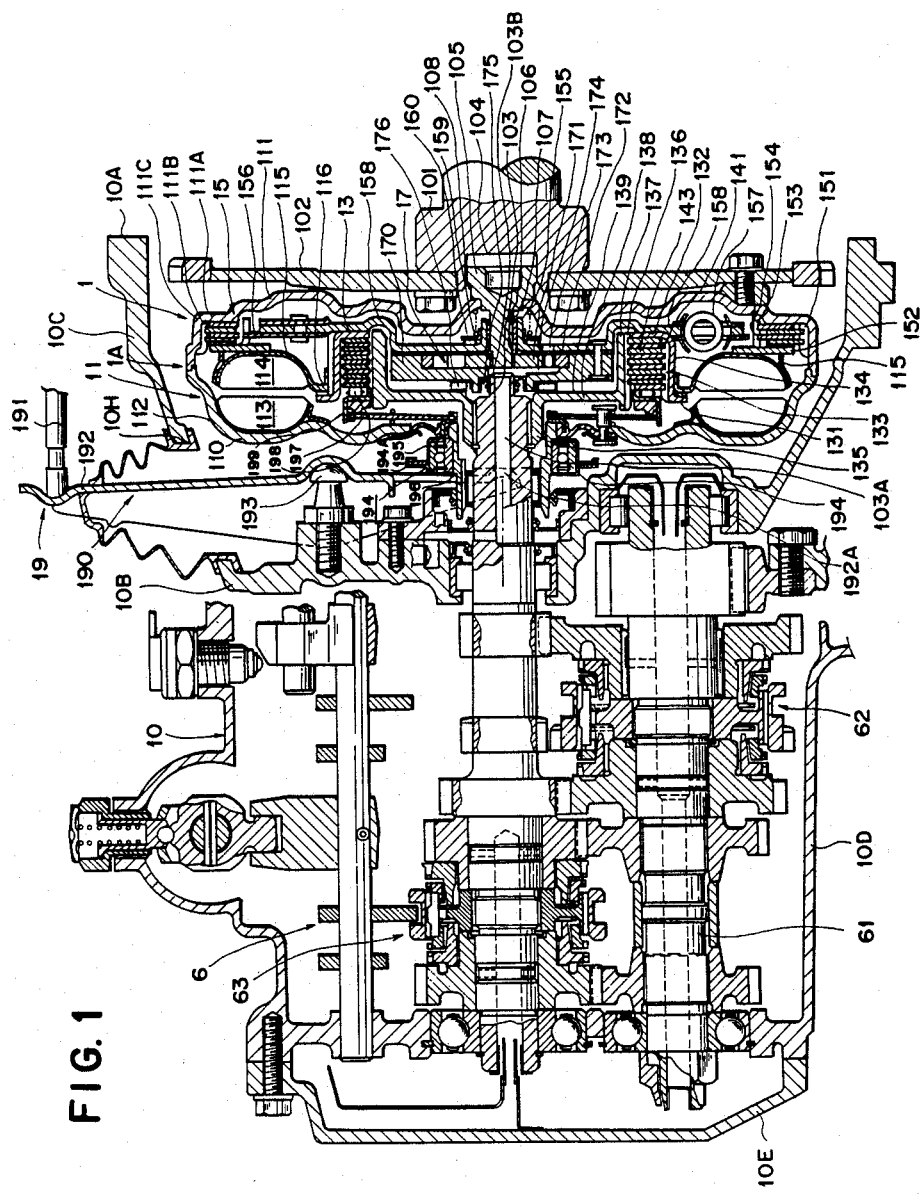
FIG. 1 is a schematic section of an F—F type automobile transmission combining a transmission gear mechanism with a power delivery system constituting a first embodiment of the invention.

Referring to FIG. 1, there is shown a triple shaft type automobile transmission in the first embodiment of the invention, including a power delivery system 1 according to the invention which is employed as a starter; a transmission gear mechanism 6 with four forward and one reverse speed ranges, a differential mechanism which is not shown, and a transmission case 10 housing these mechanisms.

Figure 2:
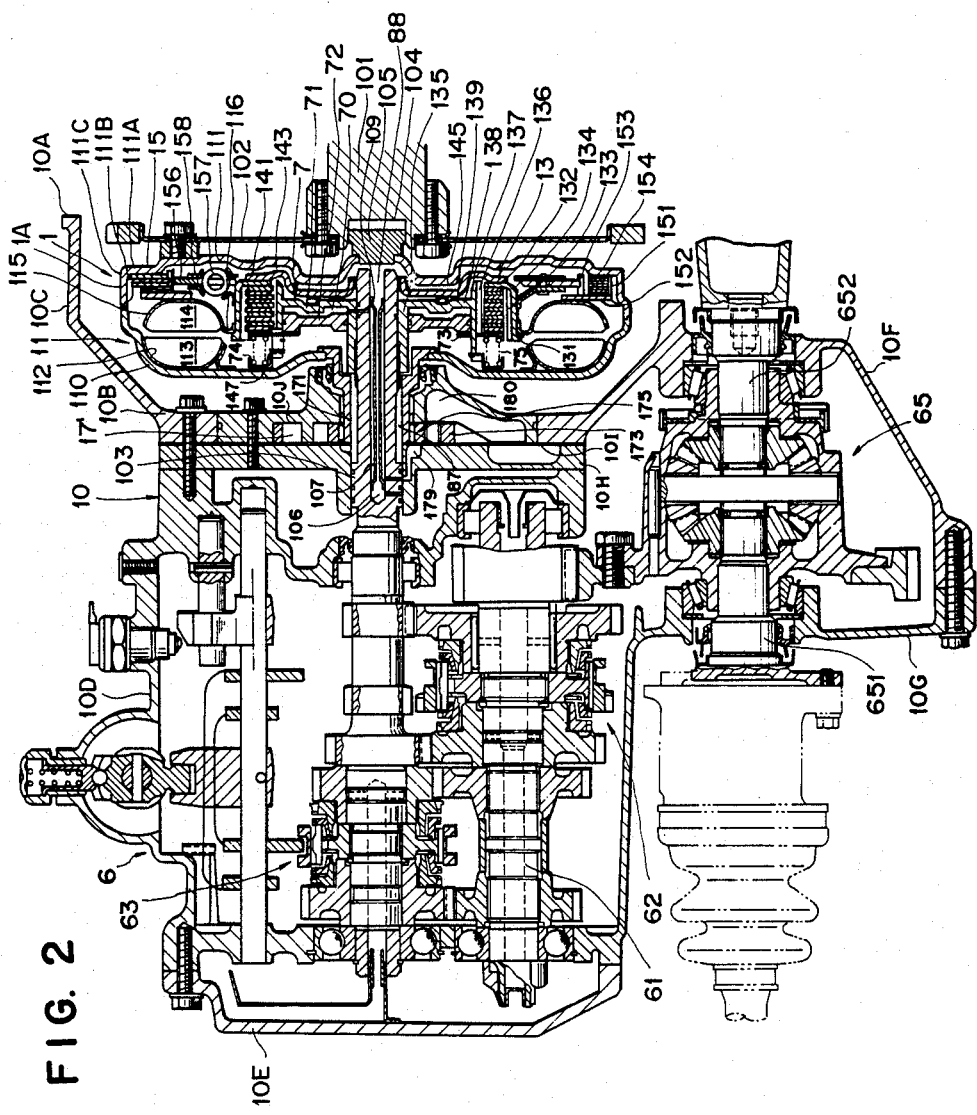
FIG. 2 is a schematic section of an F—F type automobile transmission combining a transmission gear mechanism with a power delivery system constituting a second embodiment of the invention.

The transmission case 10 includes: a shelllike starter case 10C which is open on one side 10A fastened to the engine and provided with a side wall 10B on the side of the transmission gear mechanism 6 (on the left side in the drawing and the term "left" has the same meaning in the following description); a cylindrical transmission gear case 10D which is open at the opposite ends with one end face thereof fastened to the side wall 10B of the starter case 10C; and a transmission gear case cover 10E fastened to the left end face of the transmission gear case 10D. As shown in FIG. 2 the transmission case 10 further includes; a differential case 10F integrally formed on one side of the starter case 10C; and a differential cover 10G closing the opening at the left end of the differential case and formed integrally with the transmission gear case 10D.

Returning to FIG. 1, the power delivery system 1 includes: a flat, cylindrical power delivery unit case 1A; a fluid coupling 11 mounted in an outer peripheral portion of the power delivery unit case 1A; a power cut-off clutch 13 located on a radially inner side of the fluid coupling 11; a lock-up or direct coupling clutch 15 located along the outer periphery of the fluid coupling on the side of the engine (on the right side in the drawings and the term "right side" which will appear in the following description has the same meaning) at the outer periphery of the power delivery unit case 1A; an oil pump 17 mounted between the input and output members of the fluid coupling; and a servo mechanism 19 for the clutch 13, including a diaphragm spring 197 located on the left side of the clutch 13 and supported on the inner side of the power delivery unit case 1A; and a link mechanism 190 on the outer side of and between the power delivery unit case 1A and the side wall 10B the starter case 10C.

The fluid coupling 11 includes: the power delivery unit case 1A having a front cover 111 connected through a drive plate 102 to the input shaft 101 of the power delivery system which is coupled with the engine crank shaft, and annular plate-like rear cover 110 welded to the outer periphery of the front cover 111 on the left side thereof; an annular pump shell 112 substantially L-shaped in section and integral with the rear cover being formed along the inner periphery thereof; pump blades 113 provided around and on the inner wall of the pump shell 112; turbine blades 114 confronting the pump blades 113; and a turbine shell 115 which retains the turbine blades 114 in position. Extended centrally through the front cover 111 is a center shaft 108 which is provided with a large-diameter portion forming a pilot boss 105 on the side of the engine for fitting engagement with a pilot hole 104 provided centrally on the end face of the input shaft 101. The center shaft 108 forms at its end on the side of the transmission gears (the left side in the drawing and the same applies in the following description) a drive shaft 106 for the oil pump 17 and in its intermediate portion a disk plate retaining shaft 107 for supporting the disk plate of the lock-up clutch 15 slidably in both axial and rotating directions. Formed contiguously on the inner side of the outer periphery of the front cover 111 is a cylindrical portion 111C which is provided with an annular facing 111A and an inner spline 111B forming part of the lock-up clutch. The turbine shell 115 is coupled with the output shaft 103 of the power delivery system through a clutch 13 which is located in a radially inward of and in the same axial sphere as the turbine shell 115.

The clutch 13 includes: a cylindrical clutch plate case 134 having a radially extending flange portion 131 at its left end for sliding engagement with a hub-like portion 116 formed around the inner periphery of the turbine shell 115, a radially drawn support wall 132 which is welded to the disk plate 158 of the lock-up clutch 15 which will be described in detail hereinafter, and an inner spline 133 formed on its inner periphery; a clutch disk wheel 139 having a hub portion 135 fitted on the output shaft 103 of the power delivery system through splines, a clutch drum portion 137 formed with a spline 136 on its outer periphery in a position corresponding to that of the inner spline 133 of the clutch plate case 134, and a disk portion 138 connecting the hub portion 135 and drum portion 137 with each other; a plural number of clutch plates 141 having the outer and inner peripheries thereof splined to the clutch plate case 134 and the drum portion 137 of the clutch disk wheel 139, respectively; and clutch disks 143 overlapped alternately with the clutch plates 141.

The lock-up clutch 15 includes: a plural number of clutch plates 151 fitted in spline 111B on the inner periphery of the cylindrical portion 111C of the front cover 111; an annular lock-up clutch pressure plate 152 secured to the outer periphery of the turbine shell 115; a multitude of clutch disk retaining arms 153 axially projected from the pressure plate 152 circularly at suitable intervals; a plural number of clutch disks 154 having the inner peripheries thereof splined to the retaining arms 153 and overlapped alternately with the clutch plates 151; and a disk plate 158 having a center hub portion 155 rotatably supported on the disk plate retaining shaft 107 of the center shaft 108 through a metal bearing, engaged with the retaining arms 153 on its outer periphery 156, and pressed through a thrust bearing 160 toward the transmission gear mechanism by a spring 159 which is mounted centrally thereagainst on the inner side of the front cover 111.

In this particular embodiment, the oil pump 17 is an inscribing gear pump and located within the clutch disc wheel 139 at a position between the clutch plates and the disk portion 138 of the clutch disk wheel 139. The oil pump 17 includes: a casing 170 which is secured at its outer periphery to the disk plate 158, loosely fitted at its inner periphery on a small diameter portion 103B at the fore end of the output shaft 103 of the power delivery system through an oil seal 175, and abutted against the disk portion 138 of the clutch disk wheel 139 through a thrust bearing 176; an internal gear 172 rotatably fitted in a gear room on the engine side of the casing 170; an external gear 171 splined on the fore end of the center shaft 108; a discharge port 173 provided in the casing 170 in communication with the oil passage 103A formed centrally through the output shaft 103; and a suction port 174 formed in the disk plate 158 in communication with the space between the disk plate 158 and front cover 111.

The servo mechanism 19 of the clutch 13 includes: the afore-mentioned diaphragm spring 197 mounted on the interior of power delivery unit case 1A and the link mechanism 190 mounted outside the power delivery unit case 1A. The link mechanism 190 includes a connecting rod 191 connected to a servo mechanism (not shown) which is operated by a clutch pedal provided beside the driver's seat or by the intake manifold vacuum or automatic charge and discharge of a fluid pressure or the like; a clutch lever 192 connected at its rear end to the connecting rod 191 and inserted on the left side of the power delivery unit case 1A through a hole 10H formed on the circumferential wall of the starter case 10C, and rockable about a pivotal point 193 on the side wall 10B; a bearing case 194 having a flange 194A in engagement with the fore end 192A of the clutch lever 192; a bearing 195 fitted in the bearing case 194; a sliding sleeve 196 fitted in the bearing 195 and having its right portion inserted in a gap between the inner periphery of the rear cover 110 and output shaft 103; a diaphragm spring 197 having its inner peripheral edge abutted against the right end of the sliding sleeve 196 and located on the left side of the clutch 13 within the power delivery unit case 1A; and a pressure ring 199 engaged with the outer peripheral edge of the diaphragm spring 197 to push the clutch 13 through a thrust bearing 198. The release and sliding (half coupling) of the clutch 13 are automatic or manual by the effort of a driver.

The transmission gear mechanism 6 is of a known construction utilizing the output shaft 103 of the power delivery system as its input shaft and including an output shaft 61 provided parallel with its (the) input shaft (103), a dog clutch 62 for gear shifts between the first and second speeds, a dog clutch 63 for gear shifts between the third and fourth speeds, and a reverse gear which is not shown.

The power delivery system 1 operates in the manner as follows.

When the connecting rod 191 is moved to the left in the drawing automatically or manually by the effort of a driver, the servo mechanism 19 of the clutch 13 turns the pressure rod 192 counterclockwise about the pivotal point 193 to displace the sliding sleeve 196 toward the engine through the bearing 195. Consequently, the sliding sleeve 196 causes the center portion of the diaphragm spring 197 to bulge out toward the engine, displacing to the left in the drawing the pressure ring 199 which is connected to the outer periphery of the diaphragm spring 197. By this action, the multidisk clutch 13 is released, and at the same time the lock-up clutch 15 is also released since, as a result of release of the clutch 13, the clutch disk plate case 134, turbine shell 115 and disk plate 158 are relieved of the pressure acting in the direction of the engine. In this state, the power flow is cut off by the clutch 13 to permit gear shifts of the transmission gear mechanism 6.

If the connecting rod 191 is moved to the right in the drawing automatically or manually by operation of a driver, the sliding sleeve 196 is displaced to the left in the drawing by the return action of the diaphragm spring 197, pressing the pressure ring 199 toward the engine to engage the clutch 13 thereby connecting the input and output shafts 101 and 103 of the power delivery system through the fluid coupling 11. At this time, the lock-up clutch 15 operates in the following manner. As the turbine shell 115 is connected to the output shaft 103 by engagement of the clutch 13, the power is transmitted through the fluid coupling and, if the relative rotation between the pump and the turbine is large, the lock-up clutch 15 is released against the action of the diaphragm spring 197 by the thrust force which is imposed on the turbine shell and the discharge oil pressure of the oil pump 17 which is developed due to the large relative rotation. As the relative rotation between the pump and turbine decreases, the thrust force and the discharge oil pressure of the pump are minimized and the clutch is engaged by the diaphragm spring 197.

TABLE 1

|     |     | Release | Stall (for start) | Engage |
| --- | --- | --- | --- | --- |
| (a) | T13 | A | B | C |
|     | T15 | A | D | E |
| (b) | T13 | A | B | B |
|     | T15 | A | F | B |

Figure 6:
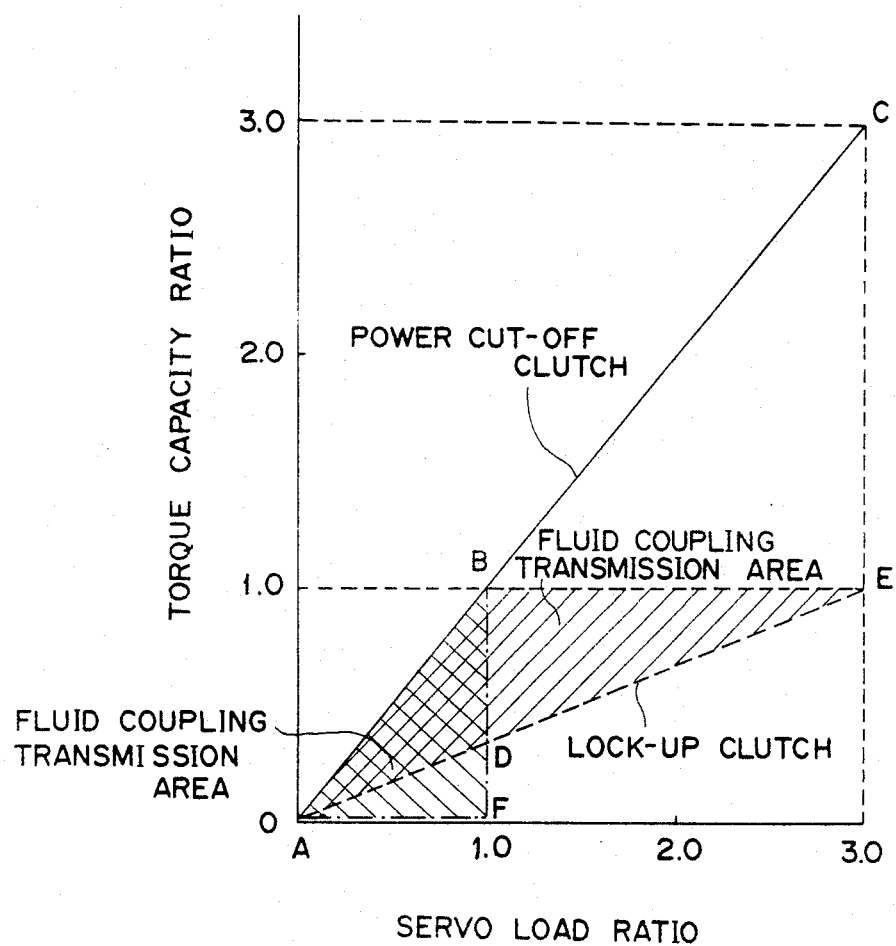
FIG. 6 a graph showing the relationship between torque capacity ratio and servo load ratio of power cut-off clutch and lock-up clutch.

As shown in Table 1 and FIG. 6, the ratios of torque capacity (torque capacity/required torque capacity) T13 and T15 of the clutch 13 and lock-up clutch 15 are varied as indicated in section (a) of Table 1 when the same servo load is applied to the clutch 13 and lock-up clutch 15. However, in a case where the torque capacity of the lock-up clutch 15 is reduced as in the foregoing embodiment, they are reduced as indicated in section (b) of Table 1.

Referring to FIG. 2, there is illustrated a second embodiment of the invention, employing as a servo mechanism for the clutch 13 of the power delivery system a hydraulic servo 7 which is provided in the clutch disk wheel 139. This hydraulic servo 7 is constituted by a piston 72 which is fitted in an annular cylinder 71 provided between the clutch drum portion 137 and hub portion 135 of the clutch disk wheel 139. In this case, upon feeding pressurized oil to the hydraulic servo 7 from conduit 109 which is provided between the output shaft 103 and a sleeve 107 fitted in the output shaft, the piston 72 is displaced to the left in the drawing and a pressure plate 73 with a return spring 75 on the back side thereof is moved to the left to release the clutch. Indicated at 17' is an oil pump which serves as a pressure source for the hydraulic servo 7. The reference numeral 65 denotes a differential mechanism which has its output shafts 651 and 652 parallel with the input and output shafts of the transmission gear mechanism.

Figure 3:
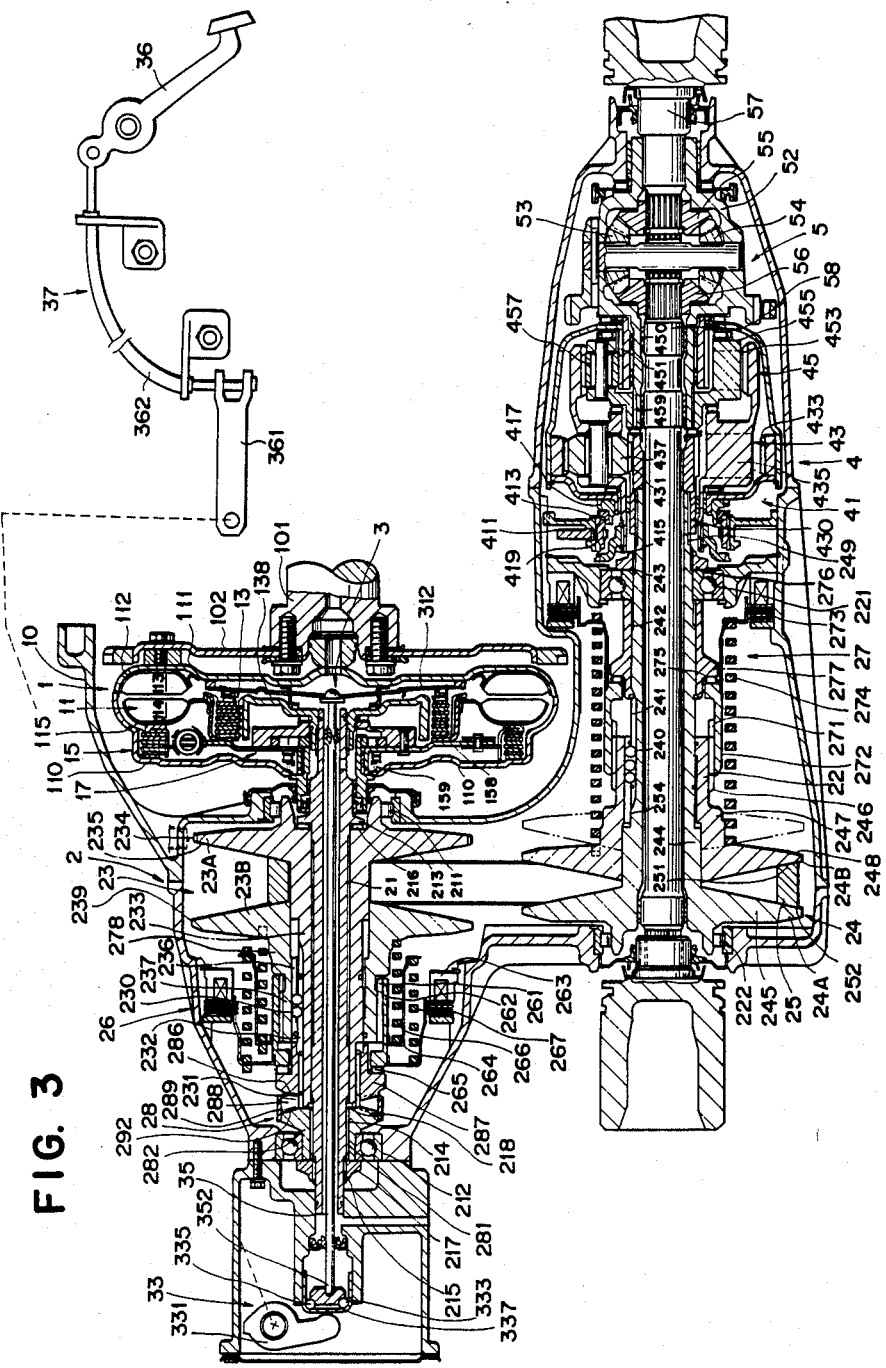
FIG. 3 is a schematic section of an F—F type autoxobile transmission combining a V-belt type stepless transmission with a power delivery system constituting a third embodiment of the invention.

Shown in FIG. 3 is a third embodiment of the invention, in which the power delivery system of the invention is combined with a V-belt type stepless transmission to constitute a stepless transmission for motor vehicles and wherein the component parts common to FIG. 1 are designated by the same reference numerals.

In this embodiment, the power delivery system 1 is constituted by the same component parts as in the first embodiment. The pump blades 113 are provided on the inner side of the outer peripheral wall portions of the front cover 111, and the lock-up clutch 15 is provided between the rear cover 110 and turbine shell 115. The torque capacity of the lock-up clutch 15 is reduced also in this embodiment by the discharge oil pressure of the pump 17 fed between the rear cover 110 and disk plate 158, the turbine thrust by the turbine, and the action of the return spring 159 interposed centrally between the rear cover 110 and disk plate 158. Indicated at 2 is a V-belt type stepless transmission, at 3 a clutch servo mechanism, at 4 a forward/reverse change-over mechanism, and at 5 a differential mechanism.

The V-belt type stepless transmission 2 includes: a hollow input shaft 21 disposed in series and concentrically relative to the engine output shaft; a hollow output shaft 22 disposed parallel with the input shaft 21; an input pulley 23 mounted on the input shaft 21; an output pulley 24 mounted on the hollow output shaft 22; a V-belt passed around the input and output pulleys 23 and 24; a servo mechanism 26 for varying the effective diameter of the input pulley 23; a servo mechanism 27 for varying the effective diameter of the output pulley 24; and a cam mechanism 28 mounted on the input pulley 23.

The axially hollowed input shaft 21 is rotatably supported in a V-belt stepless transmission case 10 through bearings 211 and 212, and formed with a stepped wall 213 at the end on the side of the engine and with outer spline 214 and end screw 215 at the opposite end.

The output shaft 22 is also axially hollowed and, in this particular embodiment, it is formed integrally with a fixed flange 24A which will be described hereinlater and rotatably supported on the case 10 of the V-belt stepless transmission through bearings 221 and 222.

The input pulley 23 includes: a fixed flange 23A which is abutted at its one end (the right end in the drawing) against the stepped wall 213 of the input shaft through a thrust bearing 216 and which includes a sleeve portion 233 having outer spline 231 and keyway 232 on the outer periphery of the other end and a flange portion 235 formed integrally with the sleeve portion 233 and provided with slits 234 around its circumference for detecting the rotational speed of the input shaft; a movable flange 23B which is axially displaceably fitted on the sleeve portion 233 of the fixed flange 23A and provided with a keyway 236 on its inner periphery at a position opposing the keyway 232 on the fixed flange and a driven screw 237 on the outer periphery as a first screw; and a ball key 230 placed in the keyways 232 and 236 to rotate the fixed and movable flanges 23A and 23B integrally about the axis while permitting relative displacement in the axial direction.

The output pulley 24 includes: a fixed flange 24A which is provided with keyway 241, spline 242, screw thread 243 and spline 249 on its outer periphery and which includes a sleeve portion 244 formed integrally with the output shaft 22 and a flange portion 245 formed integrally with the sleeve portion 244; a movable flange 24B which is axially displaceably fitted on the sleeve portion 244 of the fixed flange 24A and constituted by a sleeve-like hub portion 247 having a keyway 254 on its inner periphery at a position opposing the aforementioned keyway 241 and formed with a driven screw on its outer periphery as a first screw, and a flange portion 248 formed integrally with the hub portion 247; and a ball key 240 placed in the keyways 241 and 254 to rotate the fixed and movable flanges 24A and 24B integrally about the axis while permitting relative displacement in the axial direction.

The V-belt 25 is provided with operating surfaces 251 and 252 at opposite sides thereof, forming friction surfaces for abutting engagement with V-shaped operating surfaces on the inner sides of the fixed and movable flanges 23A, 23B, 24A and 24B of the input and output pulleys 23 and 24.

The servo mechanism 26 for the input pulley includes: a sleeve 262 serving as a movable flange drive member, which is provided with a drive screw on its inner periphery for engagement with the driven screw 237 of the movable flange 23B of the input pulley and abutted at one end against the other cam race 287 of the cam mechanism which will be described hereinlater, through a thrust bearing 265; a wet type multi-disk electro-magnetic downshift brake 263 provided between the sleeve 262 and case 10 for applying a braking force to the sleeve 262; a cylindrical spring guide 264 provided on the outer periphery of the sleeve 262; a first upshift torsion coil spring 266 located between the spring guide 264 and sleeve 262 and having an end on the side of the engine connected to the movable flange 23B and the other end to the other end of the cylindrical spring guide 264; and a second upshift torsion coil spring 267 mounted on the outer periphery of the spring guide and having an engine side end connected to one end of the spring guide 264 and its other end to the other end of the sleeve 262.

The servo mechanism 27 for the output pulley 27 includes: a sleeve 272 serving as a drive member, having a drive screw 271 on its periphery as a second screw means for engagement with the driven screw 246 of the movable flange 24B; a wet type multi-disk electro-magnetic upshift brake 273 for fixing the sleeve 272 to the case 10; a downshift torsion coil spring 274 mounted between and having the opposite ends thereof connected to the sleeve 272 and movable flange 24B; and support ring 277 which sleeve 272 bears against axially through bearing 275 direction. The support ring 277 is formed with a spline for engagement with the spline 242 of the output shaft 22 and an end face on the side of the movable flange 24B abutting against the bearing 275 and the an opposite end face abutted against a nut 276 through the inner race of the bearing 221.

Figure 4:
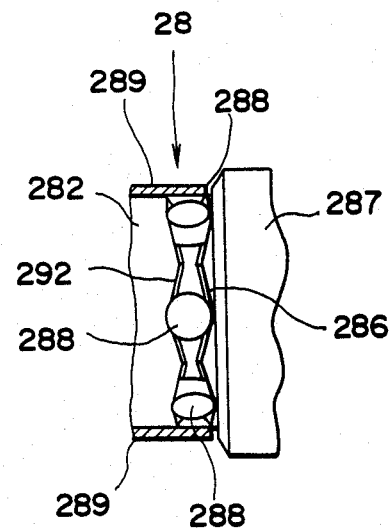
FIG. 4 is a schematic enlarged view of a cam mechanism.

The cam mechanism 28 includes: one cam race 282 which is axially fixed by a snap ring 218 fitted on the output shaft 21 as shown in FIG. 4 and a nut 217 threaded on the screw portion 215 at the end of the input shaft, and which is formed with an inner spline 281 for engagement with the spline 214 of the input shaft 21; the other cam race 287; tapered rollers 288 interposed between these cam races; and a covering 289 for the rollers 288. The rollers 288 are gripped between operating surfaces 292 and 286 of the cam races 282 and 287 to vary the pressure, which acts to push the movable flange 23B to the right in the drawing, according to the displacement in the rotational direction of the input shaft 21 and fixed flange 23A.

The V-belt type stepless transmission operates in the manner as follows.

(a) Both brakes 263 and 273 are released in constant speed cruising operation.

Figure 5:
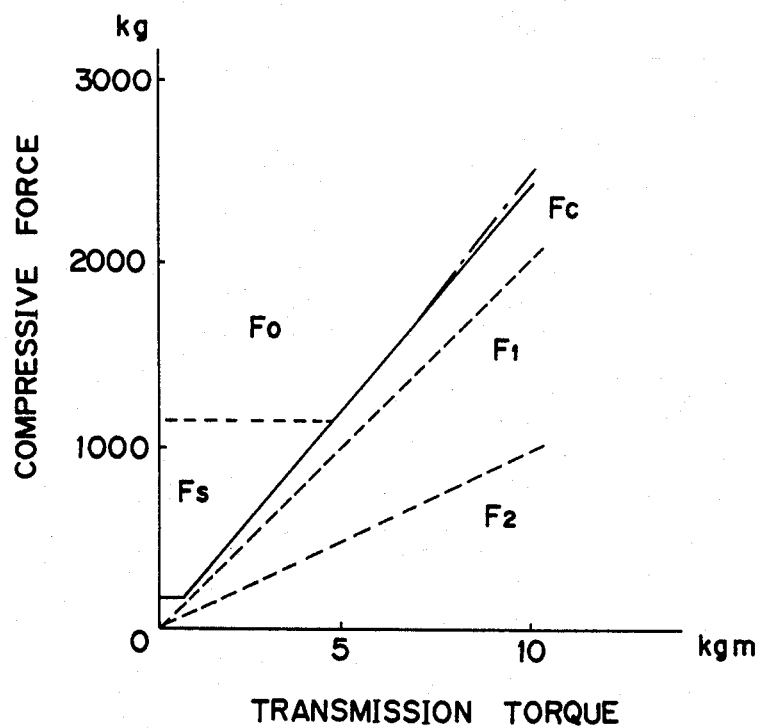
FIG. 5 is a graph explanatory of the operation of the cam mechanism.

The torque is transmitted through a path of input shaft 21—one race 282 of the cam mechanism—tapered roller 288—the other race 287—input pulley 23—V-belt 25—output pulley 24—output shaft 22. The torque which is transmitted by the V-belt 25 is proportional to the compressive force which is applied thereto. This compressive force is imposed on the other race 287 through the movable pulley 23B and the sleeve 262 which is threaded on the movable pulley 23B, slightly moving the input pulley in the rotational direction according to the principles of the cam mechanism, so that the compressive force Fc which is applied in the axial direction by the tapered roller 288 is varied in proportion to the transmitted torque as shown in FIG. 5. Accordingly, the compressive force to be applied to the movable flange 23B which grips the V-belt is varied in proportion to the transmitting torque, thereby varying the surface pressure at the operating surfaces of the V-belt 25 and the movable and fixed flanges 23B and 23A to change the compressive force on the contacting surfaces. In FIG. 5, plotted at F1 is the necessary compressive force for preventing slipping of the V-belt at the maximum reduction ratio, at F2 is the necessary compressive force for preventing slipping of the V-belt at the minimum reduction ratio, at F0 the compressive force using a conventional hydraulic servo, at Fs the compressive force using a spring. As seen in the graph of FIG. 5, the V-belt stepless transmission using the cam mechanism 28 can vary the compressive force in proportion to the transmitting torque even when the transmitting torque is smaller than 5 kgm, minimizing generation of unnecessary compressive force on the V-belt and pulley.

(b) Brake 273 is engaged for an upshift.

The sleeves 262 and 272 are rotated relative to the sleeve portions 278 and 247 of the movable flanges thereby displacing the movable flange 23B in a direction increasing the effective diameter of the input pulley 23 (to the right in the drawing) and displacing the movable flange 24B in a direction reducing the effective diameter of the output pulley 24 (to the right in the drawing) to lower the reduction ratio. As soon as the reduction ratio reaches a predetermined value, the brakes 263 and 273 are released.

By this upshift operation, the torsion spring 274 of the servo mechanism of the output pulley is twisted to store energy.

(c) Brake 263 is engaged for a downshift.

Upon engaging the brake 263, the sleeve 262 is fixed and the movable flange 23B is displaced in a direction of reducing the effective diameter of the input pulley 23 (to the left in the drawing). At the same time, the torsion spring 274 returns to its relaxed state, rotatingly driving the sleeve 272 to displace the movable flange 24B in the direction of increasing the effective diameter of the output pulley (to the left in the drawing). This displacement of the movable flange 23B of the input pulley 23 is effected against the pressure which is imposed on the movable flange 23B by the cam mechanism. As soon as the reduction ratio reaches a predetermined control value, the brake 263 is released. By this downshift operation, the first and second upshift springs 266 and 267 of the input pulley servo mechanism 26 are twisted to store energy.

In case it becomes difficult to engage the brakes 263 and 273 due to a trouble in the electro-magnetic brakes, the above-described V-belt type stepless transmission continues operation in a reduction ratio before the trouble. Therefore, it becomes possible to prevent inadvertent changes of reduction ratio as caused by oil leakage in the case of a V-belt type stepless transmission which changes the reduction ratio by a hydraulic servo, thus enhancing the safety of operation.

The clutch servo mechanism 3 is constituted by an operating section 33, a push rod 35 inserted into the hollow input shaft 21, a clutch pedal 36 and a link mechanism 37 for the clutch pedal. The operating section 33 includes a push lever 331 pivotally connected to the transmission case 10, a slide cap 333 provided in the transmission case, a bearing case 337 having its inner side abutted against one end of the push rod 35 on the side remote from the engine and its outer side rotatably supported on the inner wall surface of the slide cap 333 through a release bearing 335. If the push lever 331 is turned about its pivotal point counterclockwise in the drawing by the effort of a driver's foot or hand, the slide cap is slid toward the engine to press the push rod 35 toward the engine, thereby displacing the center of the diaphragm spring 312 in the direction of the engine along with the pressure plate to release the clutch. The clutch pedal link mechanism 37 is constituted by a link lever 361 which is securely mounted on the outer side of the transmission case 10 together with the afore-mentioned push lever 331, and a cable 362 interconnecting the free end of the link lever 361 and a clutch pedal 36.

In this embodiment, as the clutch pedal 36 of the servo mechanism 3 is depressed by a driver, the push lever 331 is rotated about its pivotal point through the cable 362 and link lever 361 to release or slide (half coupling) the clutch by operation of a driver. If desired, the clutch may be controlled automatically in a manner similar to the first embodiment.

The forward/reverse switch mechanism 4 includes a dog clutch 41, a first simple planetary gear set 43 and a second simple planetary gear set 45.

The dog clutch 41 includes: a fork 411 linked to the operating lever; a braking sleeve 413 engaged by the fork 411 and slidable in the axial direction; a first gear 415 (a spline piece); a second gear 417 (a spline piece); and a synchronizing gear 419 provided between the sleeve 413 and second gear 417.

The first planetary gear set 43 includes: a sun gear 431 formed on a sun gear shaft 430 which is engaged with the spline 249 on the output shaft 22 of the V-belt stepless transmission; a ring gear 433 connected to the second gear 417 of the dog clutch 41 and to the sun gear 451 of the second planetary gear set 45; a carrier 435 connected to the first gear 415 of the dog clutch 41 and to the second ring gear 453; and a planetary gear 437. The second planetary gear set 45 includes: a carrier 455 fitted through spline 459 on an output sleeve 450 connected to the sun gear 451, ring gear 453 and gear box of the differential mechanism; and a planetary gear 457. The forward/reverse switch mechanism 41 establishes forward motion of a predetermined reduction ratio when the sleeve 413 of the dog clutch 41 is automatically or manually meshed with the second gear 417 to hold the ring gear 433 and sun gear 451 stationary to the case 10, and reverse motion of a predetermined reduction ratio when the sleeve 413 is meshed with the first gear 415 to hold the carrier 435 and ring gear 453 stationary to the case 10.

The differential mechanism 5 utilizes as its input shaft the output sleeve 450 which forms the output shaft of the forward/reverse switch mechanism, and includes: a gear box 52 integral with the input shaft 450; small differential gears 53 and 54; differential large differential gears 55 and 56 meshed with the small differential gears; one output shaft 57 and the output shaft of the V-belt stepless transmission, which are fitted in the large differential gears through splines; first and second sun gears 431 and 451; and the other output shaft 58 extended through the output sleeve 450.

Figure 7:
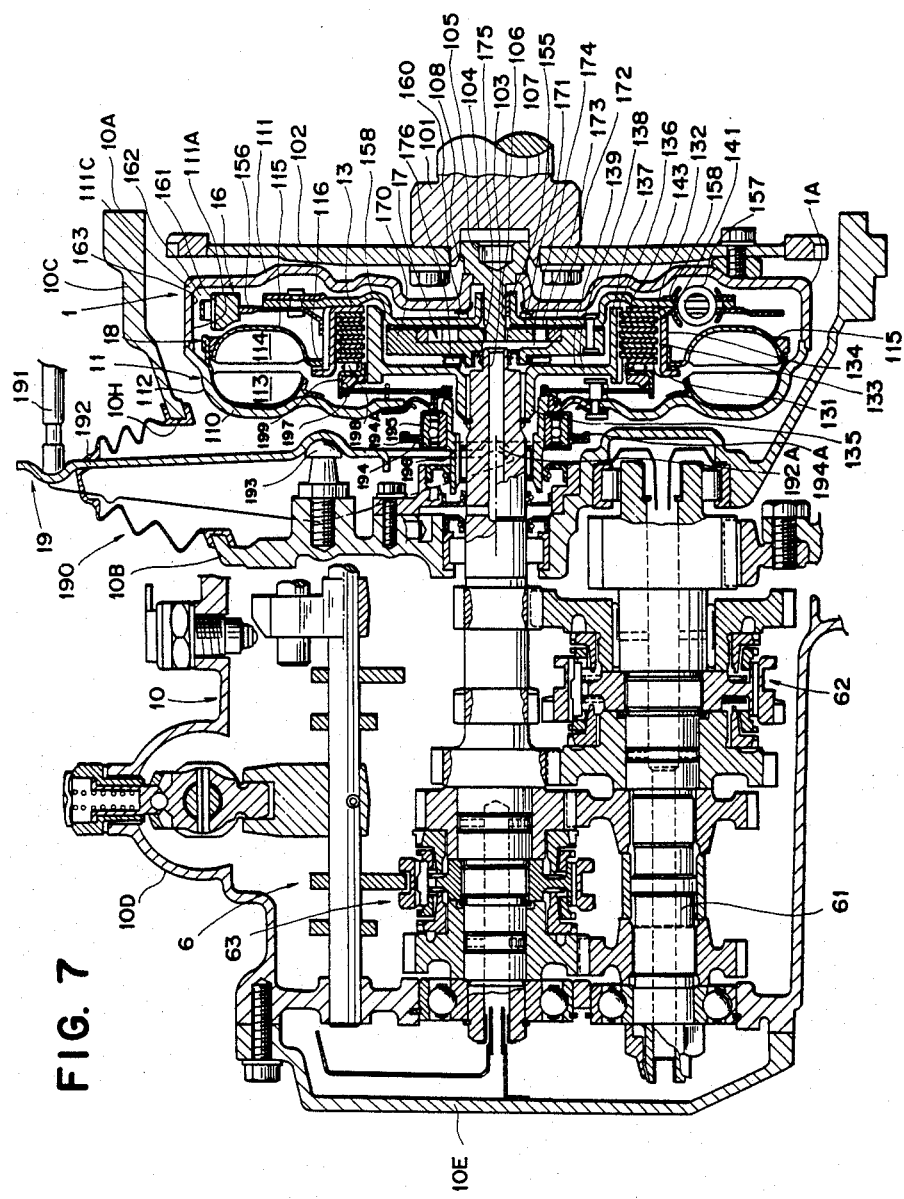
FIG. 7 is a schematic section of an F—F type automobile transmission incorporating a fourth embodiment of the invention.

Illustrated in FIG. 7 is a fourth embodiment of the invention, in which the power delivery system 1 employs a wet type centrifugal clutch 16 in place of the multi-disk lock-up clutch 16. In this embodiment, the servo mechanism 19 which consists of the diaphragm spring 197 and link mechanism 190 controls only the clutch 13.

Figure 8:
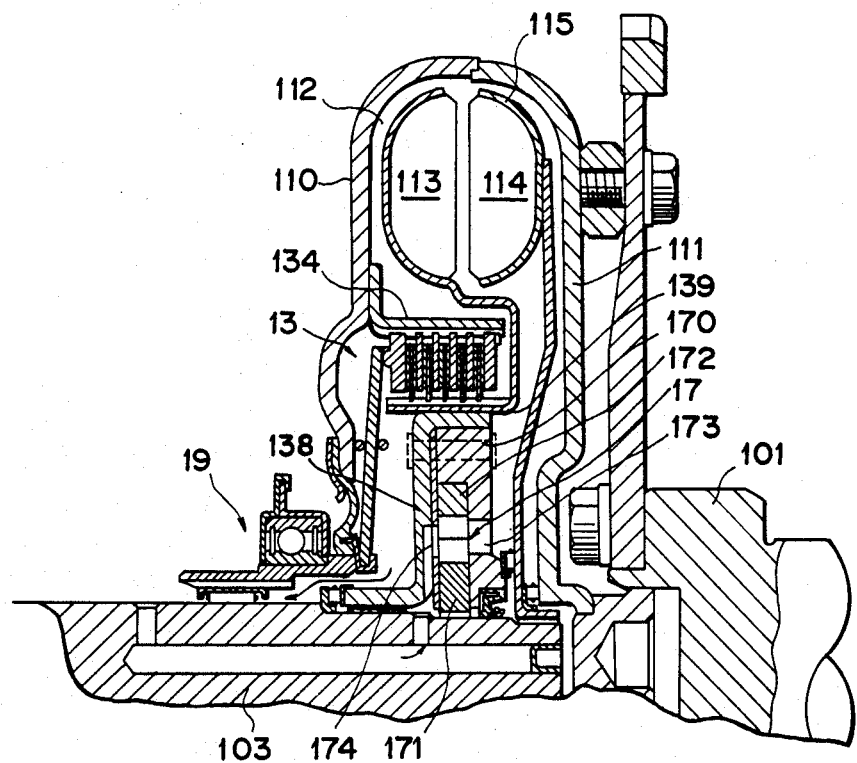
FIG. 8 is a schematic section of a power delivery system constituting a fifth embodiment of the invention.

Illustrated in FIG. 8 is a fifth embodiment which is not provided with a lock-up clutch and in which the clutch disk wheel 139 is connected to the pump and rotatably supported on the output shaft 103, and the clutch plate case 134 is securely fixed to the rear cover 110.

The oil pump 17 includes: a casing 170 fixed on the right side of a disk portion 138 of the disk wheel 139; an inner gear 172 rotatably fitted in a gear room between the disk portion 138 and the left side of the casing 170; and an outer gear splined on the output shaft 103. The operating oil which is sucked through the suction port 174 is discharged through the discharge port 173. In this case, the power transmission between the pump and input shaft 103 is cut off when the clutch 13 is released, so that the pump is rotated freely stopping the drive of the oil pump 17.

Figure 9:
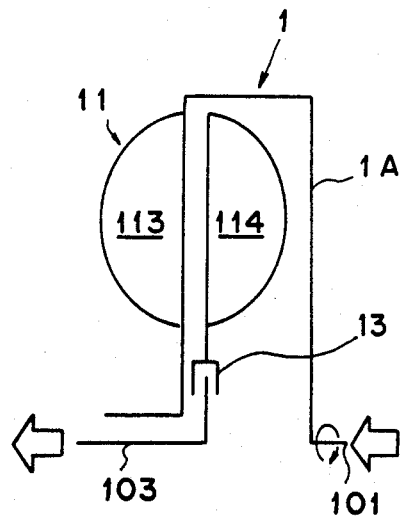
FIG. 9 is a skeletal view of a power delivery system constituting a sixth embodiment of the invention.

Illustrated in FIG. 9 is a sixth embodiment in which the clutch 13 is located radially on the inner side of the fluid coupling 11, and the lock-up clutch is omitted.

Figure 10:
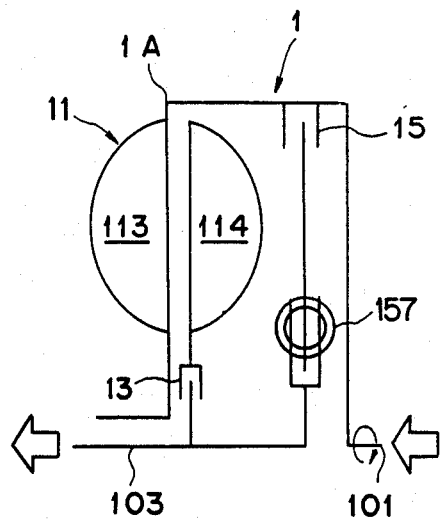
FIG. 10 is a skeletal view of a power delivery system in a seventh embodiment of the invention.

Illustrated in FIG. 10 is a seventh embodiment in which the clutch 13 is located on the inner periphery of the fluid coupling 11 to cut off the power transmission between the turbine and output shaft 103, and a lock-up clutch 15 with a damper 157 is located between the fluid coupling 11 and front cover 111. This lock-up clutch 15 is provided between the input shaft 101 (front cover 111) and output shaft 103 in parallel relation with the fluid coupling 11 and clutch 13 which is directly connected to the fluid coupling. The use of this lock-up clutch 15 enhances the transmission efficiency in engaged state.

Figure 11:
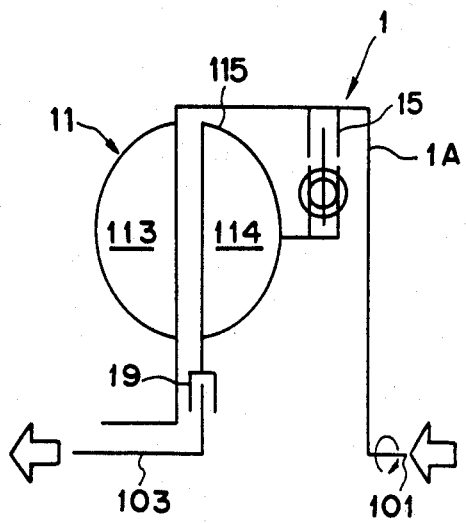
FIG. 11 is a skeletal view of a power delivery system constituting an eighth embodiment of the invention.

Illustrated in FIG. 11 is an eighth embodiment in which the lock-up clutch 15 of the fifth embodiment is located on the input side of the outer periphery of the fluid coupling 11. In this case, the lock-up clutch 15 is connected between the input shaft 101 and the turbine shell 115 thereby connecting the fluid coupling and lock-up clutch 15 parallel with each other between the input shaft 101 and turbine shell 115 and in series to the clutch 13.

Figure 12:
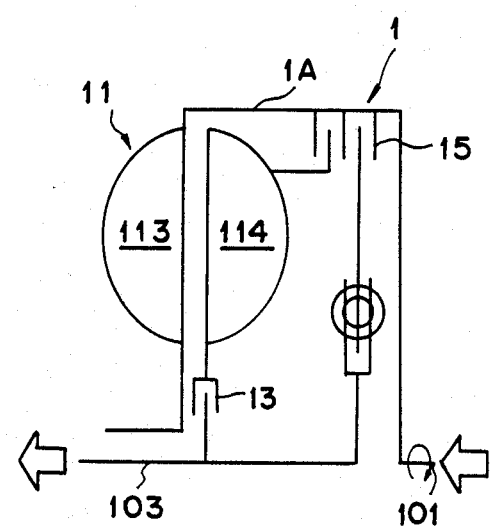
FIG. 12 is a skeletal view of a power delivery system constituting a ninth embodiment of the invention.

Illustrated in FIG. 12 is a ninth embodiment which is an combination of the fifth and sixth embodiments with respect to the location of the lock-up clutch. This arrangement increases the effect of attenuating the shocks at the time of engaging the lock-up clutch.

Figure 13:
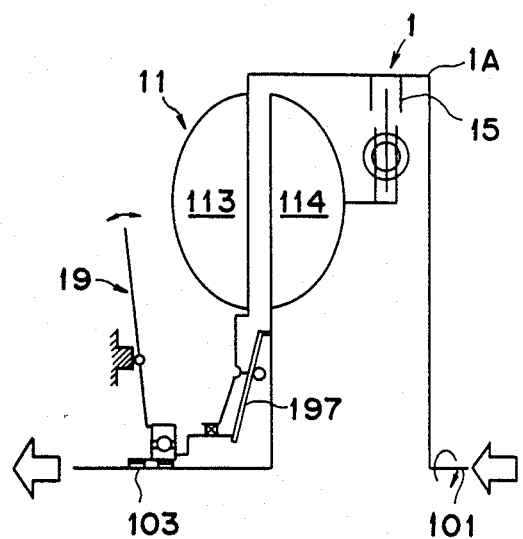
FIG. 13 is a skeletal view of a power delivery system constituting a tenth embodiment of the invention.

Illustrated in FIG. 13 is a tenth embodiment in which the power cut-off clutch 19 is omitted and only the lock-up clutch 15 is provided in the case 1A. For engaging the lock-up clutch 15, a diaphragm spring 197 which imposes a spring load thereto is mounted in the case 1A, and a servo mechanism is provided outside the case 1A.

Figure 14:
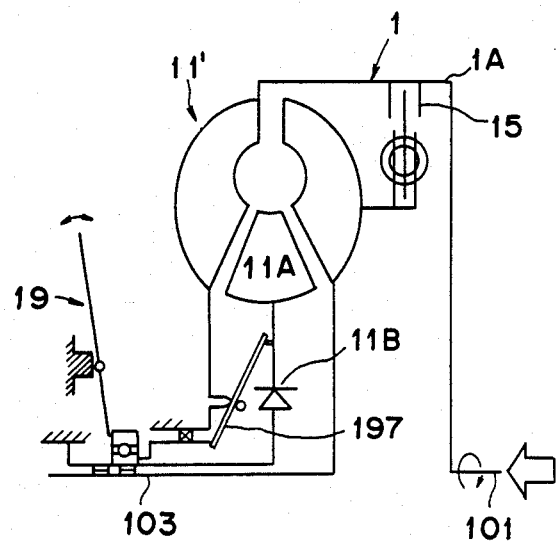
FIG. 14 is a skeletal view of a power delivery system constituting an eleventh embodiment of the invention.

Illustrated in FIG. 14 is an eleventh embodiment in which the fluid coupling of the ninth embodiment is replaced by a fluid type torque converter 11. Indicated at 11A is a stator and at 11B a one-way clutch.

As clear from the foregoing description, the power delivery system of the invention accommodates in a single power delivery unit case a fluid coupling and a power cut-off clutch and/or a lock-up clutch along with a spring means for exerting a spring load for the engagement of the clutch. Since the fluid coupling and power cut-off clutch are mounted parallelly in the axial direction in one and single case, the axial dimensions of the power delivery system can be reduced to a significant degree. In addition, the use of a common case for the fluid coupling 11 and clutch 13 makes it possible to simplify the construction of the system.

What is claimed is:

1. A power delivery system comprising:
    an input shaft for transmitting the driving force of an engine;
    a driven output shaft;
    a fluid coupling for transmitting the driving force from said input shaft to said output shaft, said fluid coupling having a fluid coupling casing connected to and rotatably driven by said input shaft, and a turbine member provided in said fluid coupling casing for being driven by fluid responsive to the rotation of said fluid coupling casing;
    a power cut-off clutch for selectively coupling said turbine member with said output shaft, said power cut-off clutch being provided in said casing and having a clutch plate connected to said turbine member, said clutch plate being mounted concentrically with and radially inward of said turbine member, and a clutch disk connected to said output shaft;
    a servomechanism for selectively coupling said power cut-off clutch, said servomechanism having biasing means fixed to said fluid coupling casing to rotate therewith for biasing said clutch plate into engagement with said clutch disk to transmit driving force from said turbine member to said output shaft;
    a first thrust bearing provided between said biasing means and said clutch plate and clutch disk set; and
    a second thrust bearing provided between said clutch plate and clutch disk set and said fluid coupling casing.

2. A power delivery system in accordance with claim 1 wherein said clutch plate and said clutch disk are radially aligned with and radially inward of said turbine member.

3. A power delivery system in accordance with claim 1 additionally comprising a lock-up clutch for selectively engaging said turbine member with said fluid coupling casing so that said turbine member is rotatably driven with said fluid coupling casing.

4. The power delivery system of claim 3 wherein said lock-up clutch is a centrifugal type clutch.

5. A power delivery system in accordance with claim 1 wherein said biasing means is a radially extending annular diaphragm spring, the outer periphery of which bears against said clutch plate and clutch disk set through said first thrust bearing, and said servomechanism further having:
    a sleeve member concentric with and mounted on said output shaft for sliding movement relative to said output shaft, the inner periphery of said diaphragm spring being fixed to said sleeve member.

6. A power delivery system comprising:
    an input shaft for transmitting the driving force of an engine;
    a driven output shaft;
    a fluid coupling for transmitting the driving force from said input shaft to said output shaft, said fluid coupling having:
    a fluid coupling casing mounted on and rotatably driven by said input shaft;
    a plurality of pump blades mounted on the interior of said fluid coupling casing; and
    a turbine member including a turbine shell rotatably mounted within said casing and a plurality of turbine blades mounted within said shell opposite said pump blades;
    a power cut-off clutch for selectively coupling said turbine member to said output shaft, said power cut-off clutch being mounted within said fluid coupling casing concentrically with and radially inward of said turbine member and comprising:
    a clutch disk wheel mounted within said fluid coupling casing on said output shaft for rotation therewith;
    a radially extending clutch disk plate rotatably mounted within said fluid coupling casing;
    a clutch plate casing including a hollow cylindrical portion and an integral, radially extending annular wall portion fixed to said clutch disk plate;
    means for engaging said clutch disk plate with said turbine shell whereby said clutch disk plate and said clutch plate casing are rotatably driven with said turbine member;
    a set of clutch plates supported by said clutch plate casing; and
    a set of clutch disks intermeshed with said clutch plates and supported by said clutch disk wheel;
    a servomechanism for operating said power cut-off clutch, said servomechanism comprising first biasing means, mounted within and fixed to said fluid coupling casing for rotation therewith, for forcing said intermeshed clutch and clutch disk sets into frictional engagement whereby driving force is transmitted from said turbine member to said cutch disk wheel and said output shaft;
    a first thrust bearing mounted between said biasing means and said intermeshed clutch plate and clutch disk sets; and
    a second thrust bearing interposed between said clutch disk plate and said fluid coupling casing.

7. The power delivery system of claim 6 wherein said input shaft and said output shaft are axially aligned and said clutch disk plate is axially slidable and further comprising:
    second biasing means, mounted within and supported by said fluid coupling casing for rotation therewith, for biasing said clutch disk plate toward said output shaft;
    said second thrust bearing being interposed between said second biasing means and said clutch disk plate.

8. A power delivery system in accordance with claim 6 wherein the cylindrical portion of said clutch plate casing has a first spline means formed on its inner periphery, said first spline means engaging said set of clutch plates and wherein said clutch disk wheel has a drum portion formed with second spline means on its outer periphery, said second spline means engaging said set of clutch disks.

9. A power delivery system in accordance with claim 7 additionally comprising a pressure ring mounted between said first biasing means and said intermeshed sets of clutch plates and clutch disks, said first biasing means bearing against said pressure ring.

10. A power delivery system in accordance with claim 9 additionally comprising a lock-up clutch for selectively engaging said turbine member with said fluid coupling casing so that said turbine member is rotatably driven with said fluid coupling casing.

11. A power delivery system in accordance with claim 9 wherein said first biasing means is a radially extending annular diaphragm spring, the outer periphery of which bears against the intermeshed clutch plates and clutch disks through said pressure ring and said first thrust bearing, and further comprising:
   a sleeve member concentric with the mounted on said output shaft for sliding movement relative to said outut shaft, the inner periphery of said diaphragm spring being fixed to said sleeve member;
   said servomechanism controlling the sliding movement of said sleeve member.

12. A power delivery system in accordance with claim 11 wherein said intermeshed clutch plates and clutch disks are radially aligned with and radially inward of said fluid coupling.

* * * * *

UNITED STATES PATENT AND TRADEMARK OFFICE
CERTIFICATE OF CORRECTION

PATENT NO. : 4,733,761

DATED : March 29, 1988

INVENTOR(S) : SAKAKIBARA et al

It is certified that error appears in the above-identified patent and that said Letters Patent is hereby corrected as shown below:

Col. 1, line 61, "autoxo-" should read --automo--.

Col. 2, line 32, "shelllike" should read --shell-like--.

Col. 6, line 51, "movatle" should read --movable--.

Col. 10, line 64, "19" should read --13--.

Col. 14, line 4, "the" should read -- and --.

Signed and Sealed this

Thirty-first Day of January, 1989

*Attest:*

DONALD J. QUIGG

*Attesting Officer*  *Commissioner of Patents and Trademarks*